Nov. 4, 1958 — E. R. PRICE — 2,858,911
COMBINED MANUAL AND POWER-ASSISTED HYDRAULIC BRAKING SYSTEM
Filed Aug. 31, 1953 — 3 Sheets-Sheet 1

Fig. 1.

INVENTOR.
EARL R. PRICE
BY
ATTORNEY.

Nov. 4, 1958  E. R. PRICE  2,858,911
COMBINED MANUAL AND POWER-ASSISTED HYDRAULIC BRAKING SYSTEM
Filed Aug. 31, 1953  3 Sheets-Sheet 2

INVENTOR.
EARL R. PRICE.
BY
ATTORNEY.

Fig. 3.

INVENTOR.
EARL R. PRICE.
BY
ATTORNEY.

United States Patent Office 2,858,911
Patented Nov. 4, 1958

2,858,911

COMBINED MANUAL AND POWER-ASSISTED HYDRAULIC BRAKING SYSTEM

Earl R. Price, South Bend, Ind., assignor to Bendix Aviation Corporation, South Bend, Ind., a corporation of Delaware Application August 31, 1953, Serial No. 377,540

8 Claims. (Cl. 188—152)

This invention relates to braking systems broadly and is particularly concerned with improvements in combined manual and booster operated hydraulic braking systems of the low-input, relatively high-output type as shown and described in U. S. Patent No. 2,470,748 and application Serial No. 740,736, which is now Patent No. 2,662,376 and which is a division of Serial No. 504,854, on which Patent No. 2,470,748 is based. Such systems have, in effect, a high displacement output side which includes the power-operated master cylinder, the brake cylinders or motors and the hydraulic fluid line or lines which connect the brake cylinders or motors to the power operated cylinder; and a low displacement input side which includes the manually operated master cylinder, the hydraulically-operated device for operating the booster control valve, and a follow-up variable-volume chamber which is in hydraulic communication with the manually-operated master cylinder and the booster control valve and increases in volume as the booster-operated master cylinder piston advances on its power stroke to displace fluid in the latter cylinder. Low input systems have some very important advantages, particularly when used in vehicles of the lighter type, such as passenger cars and light trucks, among which advantages are: (a) since the quantity of fluid required to be displaced in the manually operated master cylinder in order to energize the brake with power assistance is relatively small, only a short travel of the manually-operated fluid-displacing master cylinder piston is necessary, which correspondingly shortens the stroke of the pedal, treadle or other member for actuating said cylinder; (b) a manufacturer is enabled to adopt a standard size manually-operated master cylinder for a line of vehicles and vary the required or specified brake output displacement simply by varying the capacity or size of the power-operated cylinder and power booster; (c) the manually operated master cylinder because of its reduced size is easier to mount in the available space, and (d) the high operating pressures which are used in the low input portion of the system enable the operator to overcome the initial resistance of the system with a relatively light pedal pressure.

Short pedal travel is very important to manufacturers of motor vehicles, since less leg room in the driver's compartment becomes necessary and the brakes may be applied with ease simply by pivoting the foot about the heel between the accelerator and brake pedal or treadle. There are times, however, when due to lack of sufficient booster pressure or power, or other causes, full manual operation becomes necessary, as for example, when starting the engine of a car while the latter is standing on a hill or slope without bothering to use the emergency brake, assuming the latter is serviceable, or in case of a power failure. At such times, the driver or operator of a vehicle should be able to set the brakes by the same pedal, treadle or other manual member without necessitating any attention on the driver or operator's part other than to exert the additional force required for full manual braking, and such is an important object of the instant invention.

Briefly, this object is accomplished by a combination of means which in the event of a power failure or booster disablement, permit full manual operation by increasing the fluid-displacing movement of the pedal, treadle or other manual member for displacing fluid in the master cylinder.

Another and more specific object is to provide in a power-assisted fluid braking system of the type specified improved means tending to reset the brake pedal, treadle or other manual brake-applying device in the event of a transition from power-assistance to full manual operation, or vice versa, the reset position of the manual device being variable infinitely between a normal low-pedal brake-released position for operation with power assistance and a higher brake-released position for operation without power assistance.

Another object is to provide means whereby a full manual hydraulic braking system for motor vehicles may be combined with a power assisted system having a short stroke control member (i. e. a low pedal or treadle), simply by installing a power booster and associated master cylinder in series with the same master cylinder used in the full manual system.

A further object is to provide in a power-assisted hydraulic braking system for motor vehicles means for automatically resetting the brake pedal or treadle to different positions for full manual and power operation which acts solely on the master cylinder without requiring complicated linkage or other mechanism to vary the mechanical advantage of the pedal or treadle, the same pedal ratio being maintained as well as the soft pedal action usually present in a well-designed manual system.

The foregoing and other objects and advantages will become apparent in the light of the following description taken in conjunction with the accompanying drawings, wherein.

Figure 1:
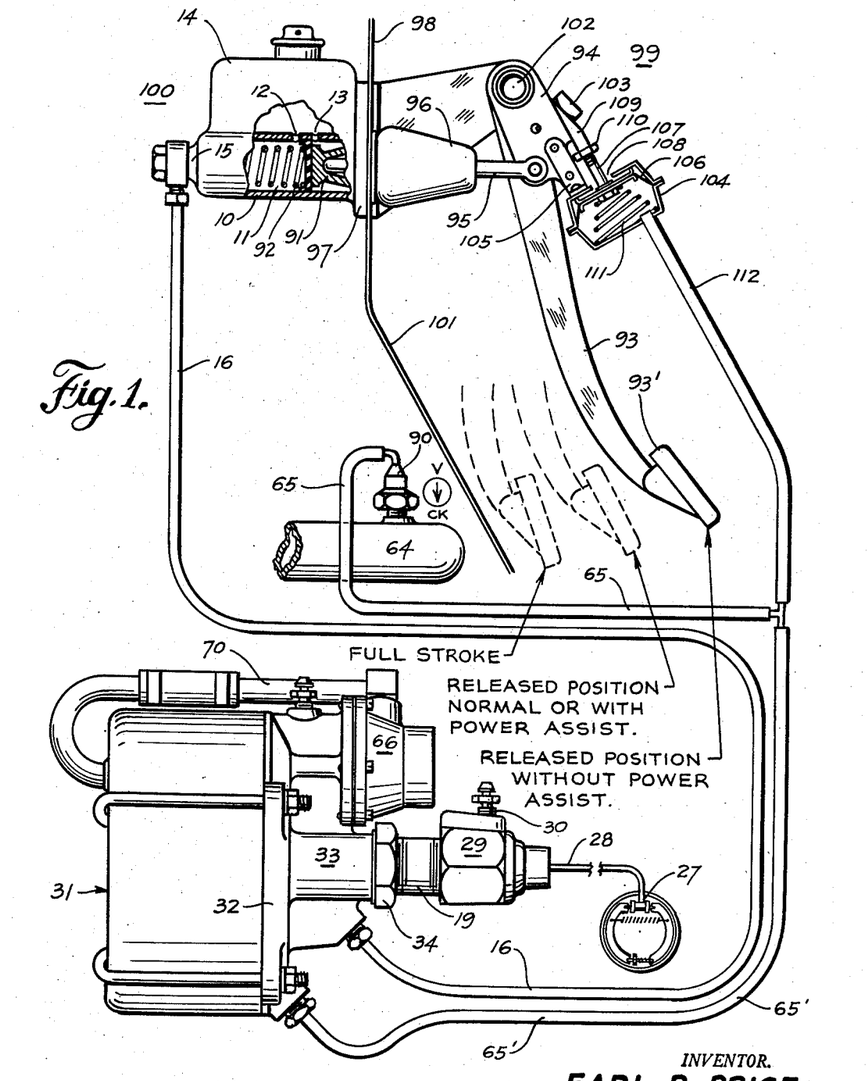
Figure 1 is a schematic view, partly in section, of a power-assisted hydraulic braking system in accordance with the invention.

Referring to the drawings and first to Figure 1 thereof, the low-displacement side of the system as a whole, or what may be termed the low input system, includes a master cylinder 10, having a bore or chamber 11 therein, which communicates by means of the conventional compensation port 12 and recuperation port 13 with a reservoir 14, adapted to receive a reserve supply of hydraulic fluid. The discharge or outlet end 15 of the master cylinder connects by way of fluid line or conduit 16 and inlet passage 16' with an annular chamber 17 (see Figure 4), which communicates with the control valve for the power booster in a manner to be described. A bore or chamber 18 is formed in a master cylinder 19, the latter sometimes being termed a power-operated master cylinder; and a master cylinder piston, generally indicated at 20, is mounted for reciprocatory movement in the bore or chamber 18 of the master cylinder, said piston having spaced lands 21 and 22 and a pair of seal rings 23 and 23' associated therewith, which engage or wipe the wall of the bore 18. The piston 20 is hollow, providing a central bore or chamber 24, which at its one end is internally threaded to receive a closure member in the form of a plug 25, formed with a restricted fluid passage 26, a function of which is to provide for compensation for any change in volume of fluid that may occur in the high-displacement side of the system which includes the chamber 18, the brake-actuating cylinders or motors, one of which is shown at 27, Figure 1, brake-actuating cyl- of which is shown at 27, Figure 1, and the brake lines communicating the discharge end of the power operated master cylinder with the brake motors, one of said lines being shown at 28 in Figure 1.

At its discharge end, the master cylinder 19 has threaded thereon a housing 29, in which is mounted the conventional residual pressure check valve 29' and bleed screw 30.

The power booster is generally indicated at 31; in the example illustrated, it comprises a cup-shaped or deeply-dished shell or cylinder 31', which at its front or right-hand end is connected in air-tight relation to a housing or casting 32, the latter being formed with a hollow central portion or boss 33, which at its front end is internally threaded to receive the contiguous end of the master cylinder 19, which is locked in sealed fluid-tight relation to said boss by a nut 34. The interior of the cylinder 31' is divided into two chambers 35 and 36 by a pressure-responsive movable wall, here shown in the form of a piston 37, which may be of any preferred construction but is illustrated as being made up of a pair of discs having a flexible seal 38 clamped between the peripheral portions thereof and adapted to engage the inner surface of the shell or cylinder 31'.

A displacement member in the form of a plunger is indicated at 40; it is hollow and at its front extremity projects through the axial bore in the boss 33 and terminates in the form of the piston 20. A tubular spacer and stop member 41 is located in the bore of the boss 33 and has a number of holes or openings 42 formed through the wall thereof, to permit hydraulic fluid to pass from chamber 17 to an annular follow-up chamber 42', to be described. The front or right-hand end of the member 41 engages the land 21 of the piston 20 and acts as a stop to thereby determine the limit of the retractile stroke of the piston. At its rear or left-hand end, the ring 41 abuts a snap ring 43, and immediately to the left of the snap ring is a seal ring 44 and a bushing or bearing ring 44'. An additional seal assembly 45 is provided at the rear of the opening in the boss 33.

It will be observed that the exposed surface area of the land 21 of piston 20 constitutes a movable wall of follow-up chamber 42' and that the pressure developed in said chamber exerts a force on said area in a direction tending to move said piston into the master cylinder chamber 18. As the piston advances into the chamber 18, the volume of chamber 42' increases. Since the chamber 42' forms part of the low displacement input system, it is important that the volume thereof be kept to a minimum to obtain the desired volume ratio between fluid input and output; and this is accomplished by having the diameter of the plunger 40 relatively large throughout at least that portion of its length which has movement in said chamber.

A compensator-port-closing or control valve is indicated at 46; it is shown as "spun" into the hollow end of a combined thrust and compensator rod, which is preferably made in two parts, indicated at 47 and 47', for a purpose to be explained, but is hereinafter identified by the reference numeral 47 alone when referring to the rod as a unitary member. The rod 47 is enlarged at 48, to provide a shoulder or abutment for the one end of spring 52. Chamber or bore 24 is placed in communication with the chamber 42' by means of ports 49, formed in the wall of the displacement plunger 40. A seal ring 50 prevents leakage of fluid from chamber 24 around the rod 47 where the latter projects thru a guide boss 51, formed internally of the plunger 40. The relatively light spring 52 exerts a force on the rod 47 in a direction tending to unseat the valve 46.

The displacement plunger 40 and compensator valve rod 47 are so connected to the power piston 37 that when the said piston is caused to initiate a power stroke, the compensator valve 46 is closed and the piston 20 advanced into the bore or chamber 18 with the rod 47 taking the thrust load and the plunger 40 maintaining the volume of the follow-up chamber 42' at a value consistent with low input displacement requirements. The section 47' of the compensator rod 47 has a stud 53, formed with a collar 54, the stud projecting thru the center of the power piston 37 and the latter being clamped between an end nut 55 and a dished bracket or fitting 56, having its central portion engaged between the collar 54 and the contiguous side of the piston. A mating bracket or fitting 57 is connected to the bracket 56 and has an axial opening for receiving the adjacent end of the displacement plunger 40, the latter being provided with a stop ring 58 for maintaining the rod section 47' within the bracket enclosure. When the power piston 37 is at rest, the position shown in Figure 4, there is a space or clearance between the adjacent end of the plunger 40 and the collar 54, as indicated at 59, and this space is preferably slightly greater than the distance required for the valve 46 to seat at 60 and effectively seal the compensating port or passage 26 when the piston is caused to initiate a power stroke.

The cup-shaped member indicated at 61 is a combined damping and guide device which is interposed between the rod sections 47 and 47'; it tends to quieten the operation of the power unit by eliminating metallic ring or sounds when the rod 47 is advanced to close valve 46 and exert its thrust load on the piston 20; and it also serves to guide and steady the rod 47 and power piston 37 connected thereto.

A return spring 62 is provided for the power piston 37; it is of the conical type with its one end abutting a seat 63, which is loosely disposed on the plunger 40 and moves with the piston 37, and at its opposite end is seated on the relatively stationary casting or housing 32.

The power unit as here shown is of the vacuum-suspended type, i. e., the piston 37 is held in released position by the application of vacuum to opposite sides thereof and which sides are of equal effective area. It will be obvious, however, that the unit could be of the atmospheric-suspended type, i. e., the piston could be held suspended by venting the respective chambers 35 and 36 to the atmosphere. The type of power unit is a matter of choice, prompted by the character of the installation involved. In the example illustrated, the vacuum or sub-atmospheric pressure developed in the engine intake manifold, indicated at 64 in Figure 1, is utilized, the said manifold being connected by conduits 65 and 65' with chamber 36 of the power cylinder 31', and chamber 35 of the said unit may be selectively connected to chamber 36 or to the atmosphere at the will of an operator by means of the control valve assembly indicated at 66 and which is generally of the type illustrated and described in Patent No. 2,470,748, heretofore noted but differs therefrom in certain particulars which render it an improvement thereon. Briefly, the control valve assembly comprises a vacuum chamber 67, an atmospheric chamber or inlet 68 and an intermediate chamber 69, the latter being in communication with the chamber 35 of the power cylinder by means of a conduit 70. A poppet valve 71, urged to its seat by a spring 72, controls atmospheric port 73, which when open communicates atmospheric pressure from chamber 68 to chamber 69 and thence by way of conduit 70 to chamber 35. A reaction or "feel" diaphragm 74 separates vacuum chamber 67 from the chamber 69; it has a central primary or first stage reaction portion 74' which is sensitive to low differentials to give an initial reaction or "feel" when the fluid is initially displaced in the master cylinder 10 to open poppet valve 71 that is of less force or magnitude than the reaction force developed across the entire effective areas of the diaphragms 74 and 74' following full opening of said poppet. A vacuum valve tube 75, which also serves as an unseating device for valve 71, is connected to the central portion of the diaphragm 74 and has a central passage 76 (which in effect constitutes a vacuum port) by means of which the vacuum existing in chamber 67 is communicated to chamber 69 when the poppet valve 71 is closed and power piston 37 is in released position. A contact plate 77 is connected to the diaphragm 74 where the latter merges with the central portion 74' and is normally urged against the web portions or radial arms of a spider 78 by a counter-reaction spring 79. A light biasing spring 80 is interposed between said plate and the central portion 74' of the diaphragm and urges the tube 75 away from the valve 71. A hydraulic valve piston 81 is reciprocably mounted in a cylinder 82 and is connected by a stem 83 and ported member 84 to the valve tube 75, the central portion 74' of diaphragm 74 being clamped between flanges formed on the member 84 and the adjacent end of tube 75. Vacuum existing in power cylinder chamber 36 is communicated to chamber 67 of the control valve by way of passage 85 (shown in dotted lines), and from this latter chamber, it may be communicated to chamber 69 by way of port or ports 86 in the member 84 and passage 76 in tube 77. Hydraulic fluid under pressure for operating the control valve flows from chamber 17 by way of restriction 87 and passage 88 to chamber 89, where it acts on the exposed end surface area of the valve piston 82.

The member indicated at 90 in Figure 1, where vacuum line 65 is tapped into the manifold 64, is a vacuum check valve for trapping vacuum in chamber 36 when the vehicle engine stops and also for maintaining the operating vacuum or pressure in said chamber at its highest operating or holding value when the power piston 37 is at rest.

Figures 2, 4:
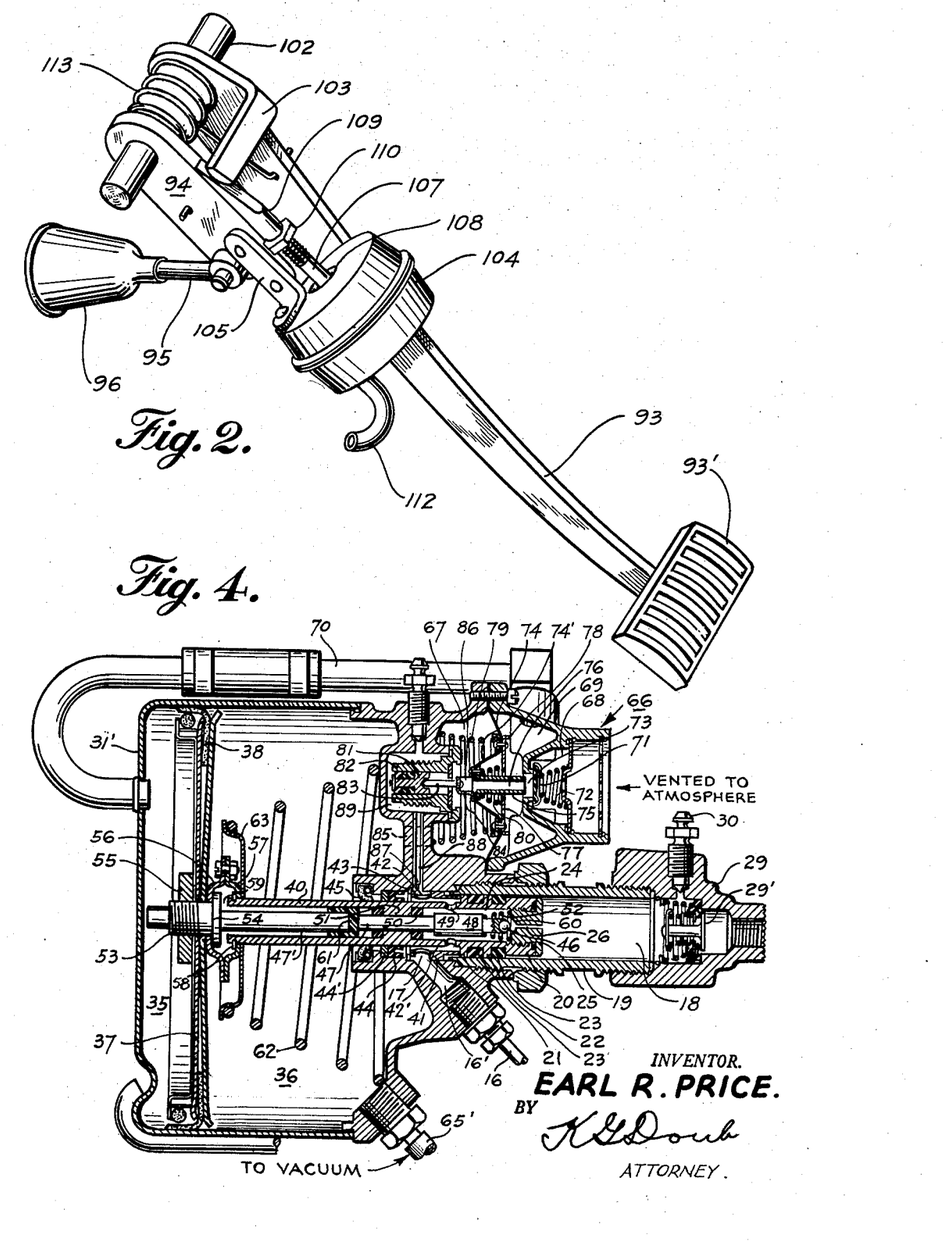
Figure 2 is an enlarged perspective view of the manually-operated means for displacing fluid in the master cylinder, here shown in the form of a pedal, with its associated automatic position-changer mechanism.
Figure 4 is a schematic section of the power booster and its associated master cylinder.

To summarize the operation of the control valve 66, let it be assumed that the hydraulic system is filled with fluid and that with the parts in the positions as shown in Figure 4, fluid is displaced in the master cylinder 10 to apply the brakes. This action will also displace or pressurize fluid in line 16, passage 16', chamber 17, passage 88 and chamber 89, moving valve piston 81 to the right and with it valve tube 75, the latter first engaging poppet 71, which action effects closure of the vacuum port or passage 76 and hence closes off vacuum from chamber 67, and substantially at the same time unseats poppet 71 and admits atmospheric pressure to chamber 69, conduit 70 and booster chamber 35, whereupon a pressure differential is developed across piston 37 and the latter moves forward or to the right on a power stroke. The initial movement of piston 37 toward the right seats valve 46, which action seals off the low-displacement side of the system from the high-displacement side. The thrust load is preferably taken primarily by the rod 47', an important function of the plunger 40 being to reduce the fluid receiving volume of the low-displacement input system. After valve 46 is seated, continued inward movement of the rod 47' advances the piston 20 into the chamber 18 to apply the vehicle brakes in the conventional manner. As the piston 20 moves to the right on its power stroke, the volume of chamber 42' increases; and should the brake pedal be held stationary, thereafter, at a given brake-applied position, a slight additional inward movement of the piston 20 will permit the valve piston 81 to retract to a point where atmospheric poppet 71 and vacuum tube 75 are each in closed or "lapped" position, thereby holding the power piston at a given position in accordance with the position of the brake pedal. In other words, the system is a "follow-up" system because power operated master cylinder displacement is proportional to pedal movement.

When the brake pedal is released, the pressure in chambers 42 and 89 is reduced, piston 81 retracts, atmospheric poppet 71 closes and passage 76 opens. Vacuum is now communicated to chamber 69 and thence by way of conduit 70 to chamber 35, the air pressure differential across the power piston 37 becomes zero and spring 62 returns said piston to its retracted position. As the power piston is returned by spring 62 to its fully retracted position, spring 52 moves compensator rod 47 to the left and unseats valve 46. Compensation for any change in volume of fluid in the chamber 18 can now take place thru restricted passage 26.

The displacement of fluid in the manually operated master cylinder 10, under normal operating conditions, viz., with power assistance, need only be sufficient to take care of the displacement in follow-up chamber 42 plus that required to operate the valve piston 81, it being understood, of course, that the master cylinder 19 will have sufficient displacement to take care of the brake motors or cylinders and/or other load devices. The total hydraulic pressure created and transmitted to the brake motors is the sum of the pressure developed by the thrust of the power piston and the hydraulic pressure acting on the land 21 of the slave cylinder piston 20.

The diaphragm 74 of the control valve assembly may be considered a reaction member in that when poppet 71 is unseated, there is a differential developed across the diaphragm which is proportional to the differential developed across power piston 37. The differential across diaphragm 74 exerts a force in opposition to movement of valve piston 81 which is proportional to but considerably less than the force exerted by the power piston in advancing the master cylinder piston 20; and this opposing force produces a reaction pressure in the master cylinder 10 which gives the desired "feel" to an operator when applying the brakes. This reaction force may be considered as taking place in two stages. The first stage is of less magnitude than the second and occurs as the poppet valve 71 opens and the differential builds up across the diaphragms 74 and 74'. During this period the differential developed across the diaphragm 74' produces the initial or first stage reaction force; and this merges into the second stage as the differential overcomes the force of spring 79 and the plate 77 contacts or "bottoms" on the flange left-hand end of tube 75.

Those parts of the power booster concerned more or less specifically with the master cylinder piston 20, displacement plunger 40 and thrust and compensator rod 47 and the manner in which they are connected to the power piston 37, along with certain features of the control valve 66, constitute the subject-matter of a separate application Serial No. 407,924, filed February 3, 1954, by Earl R. Price and Edward E. Hupp, and the advantages accruing therefrom are more fully described in said application.

Referring now to Figure 2 in conjunction with Figure 1, fluid is displaced in the master cylinder 10 by means of a piston 91, which is normally urged to retracted position by a spring 92 and is moved in a fluid-displacing direction into the cylinder by a manually-operable member, preferably in the form of a treadle or pedal 93, carrying a foot pad 93'. The pedal 93 is not directly connected to the piston 91 but has an operative connection therewith thru automatic position-changing mechanism which, when power assistance is available (normal operation) provides a relatively short pedal travel from released to full brake-applying position for easy, convenient operation simply by pivoting the foot or the heel between the accelerator and brake pedal, and when power assistance is not available, provides an increased range of pedal travel from released to applied position to ensure adequate fluid displacement at the master cylinder without "bottoming" the pedal or without so-called pedal run-out. A preferred means for accomplishing this result comprises a lever 94, which is pivotally connected to the piston 91 by a rod 95, extending thru the conventional boot 96 and also thru a supporting bracket 97, attached to wall 98, which wall separates the driver's compartment 99 from the engine compartment 100 and is shown terminating at its lower edge in a toe or foot-board 101. The lever 94 and pedal 93 are pivotally or rotatably supported at their upper ends from a shaft 102, fixed to a convenient adjacent support, not shown. The pedal may be rotated or adjusted to different angular positions relative to the lever 94 about the shaft 102; it has an arm 103, however, which overlies the lever 94 and serves as an operative connection between the pedal and lever for effecting displacement of fluid in the master cylinder 10 when the pedal is depressed or rotated clockwise about said shaft. A small air-differential type motor 104 has a casing or shell shown connected to the lever 94 by a bracket 105, the casing being comprised of a pair of half-sections having a diaphragm 106 clamped therebetween. A pin or rod 107 is connected to the central plate portion of the diaphragm and projects thru an opening 108 in the casing; and a wedge-shaped cam 109 is adjustably threaded on the free end of the pin or rod 107 and secured in adjusted position by a nut 110. A spring 111, mounted within the motor casing, normally urges the diaphragm 106 upwardly with the cam 109 interposed between the arm 103 and lever 94, at which time the pedal 93 is positioned for full manual application of the brakes without power or booster assistance. A small tube or conduit 112 connects the motor 104 with a source of vacuum here shown as engine manifold pressure. While the pedal 93 will drop by gravity to its lower normal position for operation with power assistance when the cam 109 is retracted, it is preferred to install a torsion spring 113 between the lever 94 and pedal to assist gravity and eliminate any rattling that might otherwise develop in the unit.

OPERATION

The released position of the brake pedal or treadle for normal operation (with power assistance), as illustrated in dotted lines in Figure 1, gives the low pedal advantage heretofore noted. As long as power is available, the brakes can be applied by depressing the pedal sufficiently to operate the booster control valve and displace fluid to the small volume follow-up chamber, which requires only a short travel of the pedal. Should there be a power failure, or should the booster be disabled, the brakes can be applied manually with as much force as the driver or operator can exert by displacing fluid from the input side of the system to the output side by way of passage 26 in piston 20. However, unless the ratio of input to output is above a certain minimum value, more pedal travel may be required to set the brakes manually than is available without striking the toe or floor board. Of course, resort may be had to "pumping" but such action might involve too much delay under emergency conditions.

To ensure ample range of pedal movement for manual operation without "bottoming" the pedal, the automatic positioning or resetting mechanism of Figures 1 and 2 has been provided, and the following description is directed to operation of the system with such mechanism incorporated therein:

In the position of the parts as shown in Figures 1 and 4, it may be assumed that there has either been a power failure or that the engine is being started and manifold pressure has not as yet developed in manifold 64. Under these conditions, the air differential across the diaphragm 106 will be substantially zero and the spring 111 will have pushed the wedge-shaped cam 109 in between the lever arm 94 and pedal arm 103, swinging the pedal 93 upwardly or in a counterclockwise direction to the full-line position shown in the drawings. If now pedal 93 is depressed, fluid is displaced in the master cylinder 10 and also in the line 16, passage 16' and follow-up chamber 42; and since valve 46 will then be open, fluid displaced in chamber 24 will pass thru the compensating passage 26 and effect displacement of fluid in the chamber 18 of the master cylinder 19 to operate the brake motors. Since there is no manifold pressure available to operate the power piston 37, the control valve 66 will have no effect thereon. The range of travel of the pedal 93 will be from the full-line brake-release position to the dotted-line brake-applied position, the latter varying within certain limits as brake wear occurs between adjustments. When pedal 93 is released, the brake springs retract the brake motor pistons and displace the fluid back into the system in the usual manner and effect release of the brakes.

During normal operation with power assistance, manifold pressure or suction will be communicated to the small cam-actuating motor 104, whereupon a differential force will develop across diaphragm 106, retracting cam 109 from between the lever arm 94 and the pedal arm 103, whereupon the pedal 93 will drop by gravity, assisted by spring 113, to the intermediate dotted-line position indicated in Figure 1, which is the normal brake-release position with power assistance. If now the pedal is depressed, fluid is displaced in the master cylinder 10, line 16, passage 16', chamber 42, passage 88 and chamber 89. This causes operation of the control valve 66 in the manner heretofore described, whereupon a differential is developed across the power piston 37 and the latter moves to the right as shown in Figure 4, first causing the compensator valve 46 to seat and then exerting thrust on the master cylinder piston 20 and advancing it into the chamber 18 to displace fluid in the output side of the system and energize the brake motors 27.

During brake application with power assistance, the input side of the system is sealed off from the output side, and hence the displacement in master cylinder 10 required to apply the brakes is relatively small, necessitating a correspondingly short travel of the brake pedal 93. Also, since the pressure to be developed in the input side need be, under average braking conditions, sufficient only to operate the control valve 66, it may be relatively light. Thus, during "normal" operation, or operation with power assistance, the driver or operator of a vehicle may easily and quickly apply the brakes simply by pivoting the foot about the heel between the accelerator and brake pedal. Since the master cylinder and power booster are in series, the pedal-positioner or reset mechanism need be hooked up with the master cylinder only; and in the system of Figure 1, the master cylinder may be of the conventional or standard type, since the piston 91 returns or retracts to a given position for both full manual and "normal" operation. Also, since the said positioning or reset mechanism has a direct connection with the master cylinder only, complicated multiplying and/or conversion or change-over linkage is eliminated, and the same pedal action is retained for full manual operation as would be present were the power-assistance mechanism not installed.

Figure 3:
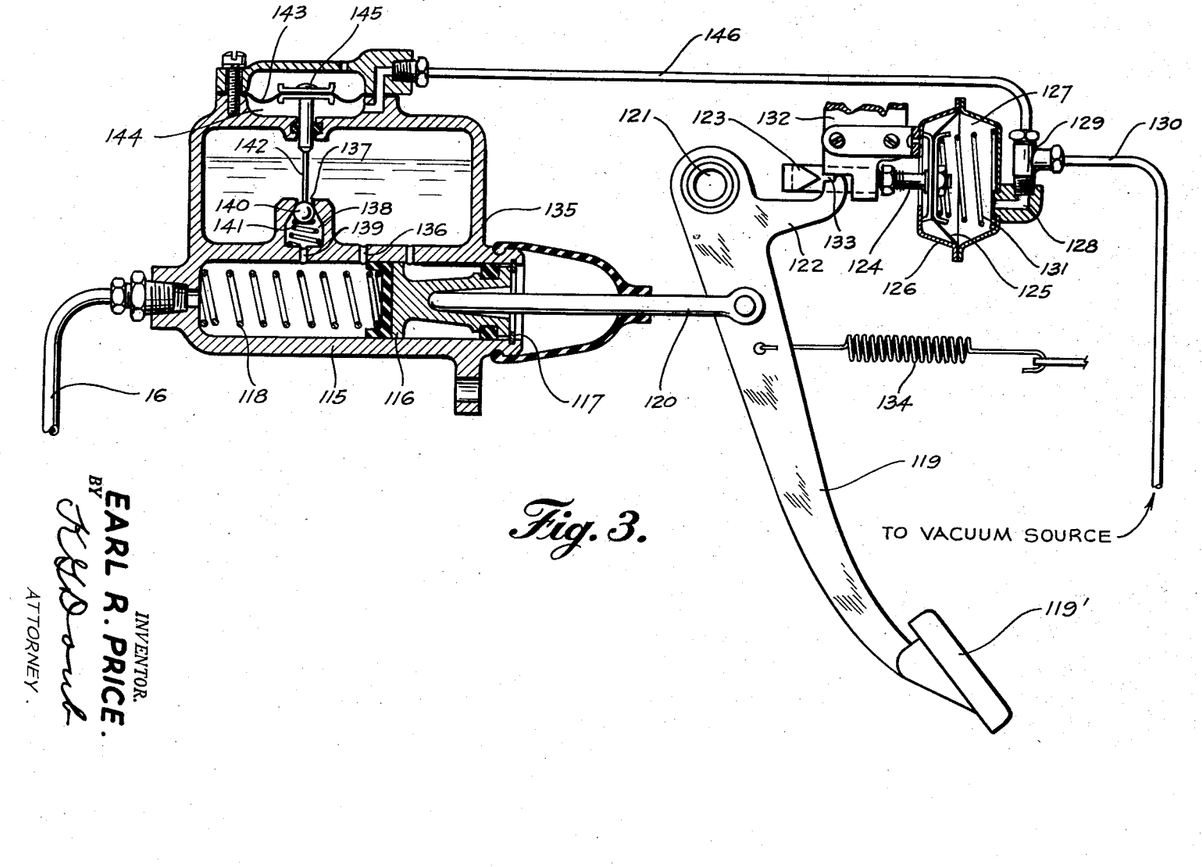
Figure 3 is a view in section and side elevation of a modified form of position-changer mechanism.

*Figure 3*

In the arrangement shown in Figure 3, the master cylinder piston moves to different retracted positions for normal and full manual retracted positions of the pedal, which necessitates a special type of fluid compensation means for the low-displacement input system in place of the conventional porting arrangement shown in Figure 1.

A master cylinder is indicated at 115; it is provided with a piston 116 which is normally urged to retracted position against a stop ring 117 by a spring 118. A brake pedal or treadle 119, provided with a foot pad 119', is operatively connected to the piston 116 by a pivoted push rod 120, said pedal being rotatably supported on a rod or shaft 121. An arm 122 projects from the upper extremity of the pedal 119 and is adapted for engagement by a wedge-shaped cam 123, which is adjustably connected to the free end of a rod 124, the opposite end of said rod being connected to a diaphragm 125, forming part of a vacuum motor 126, having a vacuum chamber 127, which is connected to a source of vacuum by way of passage 128, fitting 129 and conduit 130. A spring 131 in chamber 127 normally urges the diaphragm 125 to the left with cam 123 in its retracted or inactive position. A bracket or frame piece 132 provides a guide for cam 123 and a support for motor 126, said cam being adapted to move in and out of slot or space 133 between the free end of arm 122 and the adjacent surface of bracket 132. A stabilizing spring 134 may be provided for pedal 119.

A fluid reservoir 135 is formed on master cylinder 115, and compensating fluid may pass from said reservoir to said cylinder by way of port 136, or by way of port 137, chamber 138 and port 139, the latter being in series with port 137. A valve 140 controls port 137 and is normally urged to seated position by a spring 141, said valve having a stem 142 connected to a diaphragm 143, which forms a movable partition between vacuum chamber 144 and atmospheric chamber 145. A conduit 146 serves to communicate vacuum to chamber 144.

In the position of the parts as shown in Figure 3, the pedal 119 is "up" to obtain the maximum or required displacement in master cylinder 115 for manual braking operation without power assistance, it being assumed that there is insufficient manifold pressure or "suction" available to retract the diaphragm 125 and cam 123 carried thereby against the force of spring 131 to a point where the cam engages in the space 133. With the cam 123 out of said space, the pedal 119 assumes the position above stated when the brakes are released, and the master cylinder piston 116 is back of the recuperation port 136, so that compensation for any loss of fluid in the system may take place thru said port. If now the pedal 119 is depressed, fluid is displaced in the master cylinder 115 and also in line 16, passage 16′ and chamber 42 of the power unit of Figure 4 and the brakes are applied as described in connection with Figures 1, 2 and 4. Since manifold suction is low or non-existent in chamber 144, the differential across diaphragm 143 will be insufficient to unseat valve 140 against the closing force exerted by spring 141, and once the master cylinder piston moves past port 136 during its displacement stroke, the pressure generated in valve chamber 138 will exert additional closing force on valve 140.

Whenever there is sufficient manifold pressure or "suction" available to operate the power booster of Figure 4, there will likewise be sufficient suction available to retract diaphragm 125 against the force exerted by spring 131, which action will move cam 123 into operative position in the space 133, whereupon pedal 119 will be moved downwardly or clockwise to its reduced-travel position for operation of the brakes with power assistance in the same manner as described in connection with Figures 1, 2 and 4. However, when pedal 119 is in its fully retracted position for operation with power assistance, the master cylinder piston 116 does not retract to a point where compensation can take place thru port 136 but it does retract sufficiently to permit compensation thru port 139. Since manifold suction is then communicated to chamber 144, the differential across diaphragm 143 unseats valve 140, permitting compensation fluid to pass from reservoir 135 thru port 137, valve chamber 138 and the said port 139.

The arrangement disclosed in Figure 3 may be better adapted for certain installations than that disclosed in Figures 1 and 2.

It will be obvious to those skilled in the art that the objects of the invention may be attained by constructions and arrangements differing in certain respects from those disclosed herein. The foregoing and other modifications are contemplated within the scope of the invention as defined by the appended claims.

I claim:

1. In an automotive power operated hydraulic braking system and the like: a first hydraulic pressure producing device having a fluid displacement member therein; a second power driven hydraulic pressure producing device having a fluid displacement member therein; said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid received from said first device, said second device requiring a volume of fluid from said first device which is only a fraction of the displacement of the fluid displacement member of the second device during a power actuation of the second device; a lever having a normal retracted high position and a fixed low position; means operatively connecting said lever to said fluid displacement member of said first device in such manner as to provide a generally fixed rate of movement for said fluid displacement member with respect to the rate of movement of said lever between its retracted high position and its low position; and means sensitive to the power supply for said second device for lowering the retracted position of said lever to a position intermediate said high and low positions when power is available without substantially changing the rate of movement of said displacement member with respect to said lever, said means being constructed and arranged to regulate the intermediate position of said lever to provide a fluid displacement for said first device which is substantially no greater than required to produce a complete power actuation of said second device as established hydraulically by said second device.

2. In an automotive power operated hydraulic braking system and the like: a first hydraulic pressure producing device having a fluid displacement member therein; a second power driven hydraulic pressure producing device having a fluid displacement member therein; said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid received from said first device, said second device requiring a volume of fluid from said first device which is only a fraction of the displacement of the fluid displacement member of the second device during a power actuation of the second device; a frame structure having a first fixed member; a second member for actuating said fluid displacement member of said first device; a lever pivotally supported by said frame and having a predetermined lower limit of travel and a normal retracted high position; a camming member or wedge reciprocable between said lever and one of said first and second members for lowering the retracted position of said lever from said high position to an intermediate position; and a motor driven by the same power source as is used for supplying said second device and constructed and arranged to position said camming member in a manner establishing said intermediate position when said power source will no longer adequately operate said second device, said camming member being shaped and arranged to lower said lever by a predetermined amount and thereby establish its intermediate position in a positive manner assuring sufficient displacement for the fluid displacement member of said first device to produce a complete power actuation of its fluid displacement member, and whereby a system is provided in which the actuating lever is positioned by simple, reliable and inexpensive means whose adjustment is not critical and which is not adversely affected by wear, and the change over in rate of control lever movement required as between power actuated and manually actuated conditions is controlled hydraulically in said second device.

3. In an automotive power operated hydraulic braking system and the like: a first hydraulic pressure producing device having a fluid displacement member therein; a second power driven hydraulic pressure producing device having a fluid displacement member therein, said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid received from said first device, said second device requiring a volume of fluid from said first device which is only a fraction of the displacement of the fluid displacement member of the second device during a power actuation of the second device; a frame structure; a second member for actuating said fluid displacement member of said first device pivoted to said frame structure; a lever pivotally supported by said frame and having a predetermined lower limit of travel and a normal retracted high position; said second member and said lever each having an abutment surface positioned to face each other with the abutment surface of said lever positioned above the abutment surface on said second member; a camming member or wedge reciprocable between said abutment surfaces for holding said lever in said high position when a thick portion of said wedge separates said abutment surfaces and for lowering said lever to an intermediate position by providing a lesser thickness of wedge for separating said abutment surfaces; and a motor driven by the same power source as is used for supplying said second device and constructed and arranged to position said camming member in a manner establishing said intermediate position when said power source will no longer adequately operate said second device, said thickness of said wedge being so proportioned as to establish the amount of lowering of said lever from its high to its lower position at an amount which when subtracted from its normal high position will still assure sufficient displacement of said first pressure producing device to produce a complete power actuation of said second device, and whereby a system is provided in which the actuating lever is positioned by simple, reliable and inexpensive means whose adjustment is not critical and which is not adversely affected by wear, and whereby the change over in rate of control lever movement required as between power actuated and manually actuated conditions is controlled hydraulically in said second device.

4. In an automotive power operated hydraulic braking system and the like: a first hydraulic pressure producing device having a fluid displacement member therein; a second power driven hydraulic pressure producing device having a fluid displacement member therein, said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid received from said first device, said second device requiring a volume of fluid from said first device which is only a fraction of the displacement of the fluid displacement member of the second device during a power actuation of the second device; a frame structure; a second member for actuating said fluid displacement member of said first device pivoted to said frame structure; a lever pivotally supported by said frame on the same center as said second member and having a predetermined lower limit of travel and a normal retracted high position; said second member and said lever each having an abutment surface positioned to face each other with the abutment surface of said lever positioned above the abutment surface on said second member; a camming member or wedge reciprocable between said abutment surfaces for holding said lever in said high position when a thick portion of said wedge separates said abutment surfaces and for lowering said lever to an intermediate position by providing a lesser thickness of wedge for separating said abutment surfaces, and a motor driven by the same power source as is used for supplying said second device and constructed and arranged to position said camming member in a manner establishing said intermediate position when said power source will no longer adequately operate said second device, said thickness of said wedge being so proportioned as to establish the amount of lowering of said lever from its high to its lower position at an amount which when subtracted from its normal high position will still assure sufficient displacement of said first pressure producing device to produce a complete power actuation of said second device, and whereby a system is provided in which the actuating lever is positioned by simple, reliable and inexpensive means whose adjustment is not critical and which is not adversely affected by wear, and whereby the change over in rate of control lever movement required as between power actuated and manually actuated conditions is controlled hydraulically in said second device.

5. In an automotive power operated hydraulic braking system and the like: a first hydraulic pressure producing device having a fluid displacement member therein; a second power driven hydraulic pressure producing device having a fluid displacement member therein, said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid reecived from said first device, said second device requiring a volume of fluid from said first device which is only a fraction of the displacement of the fluid displacement member of the second device during a power actuation of the second device; a frame structure; first and second generally parallel levers pivotally supported to said frame structure about a common pivotal point, said second lever having an arm which extends over the top of said first lever, a push rod operatively connected to said first lever for moving the fluid displacement member of said first device, a camming member or wedge reciprocable between the top surface of said first lever and said arm of said second lever, and a motor driven by the same power source as is used for supplying said second device and constructed and arranged to position a thick portion of said camming member between the top of said first lever and said arm to hold said second lever in a high position when said power source is not adequate to power actuate said second device, and to withdraw said thick portion of said wedge to lower said second lever by a fixed amount when power is available to actuate said second device, whereby a system is provided in which the actuating lever is positioned by simple, reliable and inexpensive means whose adjustment is not critical and which is not adversely affected by wear, and the change over in rate of control lever movement required as between power actuated and manually actuated conditions is controlled hydraulically in said second device.

6. In an automotive power operated hydraulic braking system and the like: a first hydraulic pressure producing device having a fluid pressuring chamber therein; a first fluid displacement member in said chamber for displacing fluid therefrom when moved from an outer retracted position to an inner position, said first displacement member also having an intermediate retracted position therein; a reservoir for supplying hydraulic fluid to said chamber; means for communicating said reservoir to said chamber when said first fluid displacement member is in its outer retracted position and which is closed off when said first displacement member is moved inwardly from its outer retracted position; a second power driven hydraulic pressure producing device having a second fluid displacement member therein, said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid received from said first device, said second device requiring a volume of fluid from said first device which is only a fraction of the displacement of the fluid displacement member of the second device during a power actuation of the second device; a frame structure having a first fixed member, a lever pivotally supported by said frame and operatively connected to said fluid displacement member of said first device in a manner providing corresponding high, low and intermediate positions for said lever; a camming member or wedge reciprocable between said lever and said first member for lowering the retracted position of said lever from said high position to said intermediate position and thereby moving said fluid displacement member from its retracted position to its intermediate position; motor means driven by the same power source as is used for supplying said second device and constructed and arranged to position said camming member in a manner establishing said intermediate position when said power source will no longer adequately operate said second device; and second means for communicating said reservoir with said chamber, said second means being constructed and arranged to be closed off when power is not available to actuate said second device, to be opened when said first fluid displacement member is in its intermediate position and power is available to actuate said second device, and to be closed off when said first displacement member is moved inwardly from its intermediate position and power is available to actuate said second device.

7. In an automotive power operated hydraulic braking system and the like: a first hydraulic pressure producing device having a fluid pressuring chamber therein; a first fluid displacement member in said chamber for displacing fluid therefrom when moved from an outer retracted position to an inner position; said first displacement member also having an intermediate retracted position therein; a reservoir for supplying hydraulic fluid to said chamber; means for communicating said reservoir to said chamber when said first fluid displacement member is in its outer retracted position and which is closed off when said first displacement member is moved inwardly from its outer retracted position; second means for communicating said reservoir with said chamber when said first fluid displacement member is outwardly of said intermediate position and which is closed when said first fluid displacement member is moved inwardly of said intermediate position; a second power driven hydraulic pressure producing device having a second fluid displacement member therein, said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid received from said first device, said second device requiring a volume of fluid from said first device which is only a fraction of the displacement of the fluid displacement member of the second device during a power actuation of the second device; a frame structure having a first fixed member; a lever pivotally supported by said frame and operatively connected to said fluid displacement member of said first device in a manner providing corresponding high, low and intermediate positions for said lever; a camming member or wedge reciprocable between said lever and said first member for lowering the retracted position of said lever from said high position to said intermediate position and thereby moving said first fluid displacement member from its retracted position to its intermediate position; motor means driven by the same power source as is used for supplying said second device and constructed and arranged to position said camming member in a manner establishing said intermediate position when said power source will no longer adequately operate said second device; and means which closes said second means when power is not available to operate said second device and which opens said second means when power is available to actuate said second device.

8. In an automotive power operated hydraulic braking system and the like: a first hydraulic pressure producing device having a fluid pressuring chamber therein; a first fluid displacement member in said chamber for displacing fluid therefrom when moved from an outer retracted position to an inner position; said first displacement member also having an intermediate retracted position therein; a reservoir for supplying hydraulic fluid to said chamber; means for communicating said reservoir to said chamber when said first fluid displacement member is in its outer retracted position and which is closed off when said first displacement member is moved inwardly from its outer retracted position; second means for communicating said reservoir with said chamber when said first fluid displacement member is outwardly of said intermediate position and which is closed when said first fluid displacement member is moved inwardly of said intermediate position; a second power driven hydraulic pressure producing device having a second fluid displacement member therein, said second hydraulic pressure producing device receiving the hydraulic discharge pressure of said first hydraulic pressure producing device and being constructed and arranged to communicate the pressure fluid from said first pressure producing device directly to the discharge of said second pressure producing device when no power is available to actuate said second pressure producing device, and to valve off said first device from the discharge of said second device while causing a power actuation of its fluid displacement member, which power actuation of the fluid displacement member produces a pressure greater than and generally proportional in intensity to the pressure of fluid received from said first device, said second device requiring a volume of fluid from said first device which is only a fraction of the displacement of the fluid displacement member of the second device during a power actuation of the second device; a frame structure having a first fixed member, a lever pivotally supported by said frame and operatively connected to said fluid displacement member of said first device in a manner providing corresponding high, low and intermediate positions for said lever; a camming member or wedge reciprocable between said lever and said first member for lowering the retracted position of said lever from said high position to said intermediate position, and thereby moving said first fluid displacement from its retracted position to its intermediate position; motor means driven by the same power source as is used for supplying said second device and constructed and arranged to position said camming member in a manner establishing said intermediate position when said power source will no longer adequately operate said second device; a check valve in said second means, spring biased closed to prevent flow from said chamber to said reservoir; and means for opening said check valve when power is available to operate said second device.

References Cited in the file of this patent

UNITED STATES PATENTS

| | | |
|---|---|---|
| 2,208,282 | Shelor | July 16, 1940 |
| 2,265,546 | Price | Dec. 9, 1941 |
| 2,353,755 | Price | July 18, 1944 |
| 2,372,842 | Mossinghoff | Apr. 3, 1945 |
| 2,393,524 | Fant | Jan. 22, 1946 |
| 2,402,435 | Newton | June 18, 1946 |
| 2,526,236 | Ingres | Oct. 17, 1950 |
| 2,596,040 | Nutt | May 6, 1952 |
| 2,662,376 | Price et al. | Dec. 15, 1953 |
| 2,755,891 | Levell et al. | July 24, 1956 |

UNITED STATES PATENT OFFICE
CERTIFICATE OF CORRECTION

Patent No. 2,858,911

November 4, 1958

Earl R. Price

It is hereby certified that error appears in the printed specification of the above numbered patent requiring correction and that the said Letters Patent should read as corrected below.

Column 3, line 5, strike out "of which is shown at 27, Figure 1, brake-actuating cyl-".

Signed and sealed this 27th day of October 1959.

(SEAL)

Attest:
KARL H. AXLINE
Attesting Officer

ROBERT C. WATSON
Commissioner of Patents